United States Patent [19]

Thompson

[11] 4,377,754
[45] Mar. 22, 1983

[54] SWITCHING CIRCUIT FOR A REMOTE CONTROL SYSTEM

[75] Inventor: David R. Thompson, Ladybank, Scotland

[73] Assignee: Pico Electronics Limited, Glenrothes, Scotland

[21] Appl. No.: 238,166

[22] Filed: Feb. 26, 1981

[30] Foreign Application Priority Data

Mar. 5, 1980 [GB] United Kingdom ................ 8007568

[51] Int. Cl.³ .......................................... H01N 19/64
[52] U.S. Cl. ................................................... 307/114
[58] Field of Search ............................... 307/112–115, 307/125

[56] References Cited

U.S. PATENT DOCUMENTS 2,835,830 5/1958 Rathenau ............................. 307/114
3,287,722 11/1966 Craig .................................... 307/114

Primary Examiner—Donald A. Griffin
Attorney, Agent, or Firm—Murray & Whisenhunt

[57] ABSTRACT

The switching circuit couples an appliance (1) to a power main (LN) via remotely controllable switching means (2) and is operable to change the state of the switching means (2) in response to a manual double switching of the appliance power switch so that the appliance can be manually switched ON after it has been remotely switched OFF.

A capacitor (CAP1) generates from the mains voltage an alternating current signal of a phase differing from that of the mains voltage by an amount dependent on the external impedance across the output. The switching circuit monitors this phase difference and changes the state of the switching means (2) if it detects two phase difference changes exceeding a predetermined value in opposite senses within a predetermined time period, this being indicative of a manual double switching of the appliance power switch.

The switching circuit does not operate spuriously for thermostatically controlled appliances nor in response to noise spikes.

12 Claims, 5 Drawing Figures

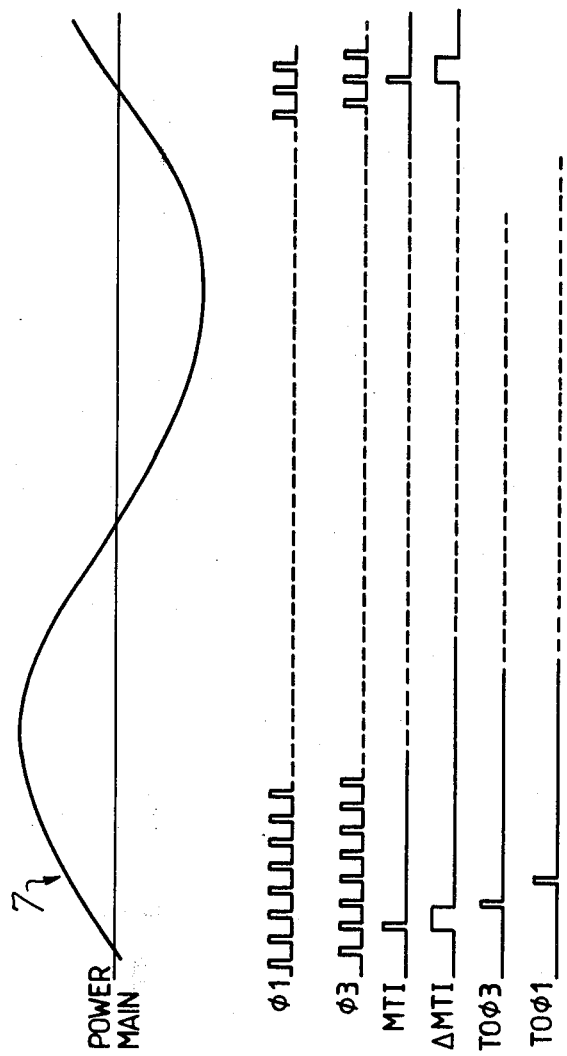

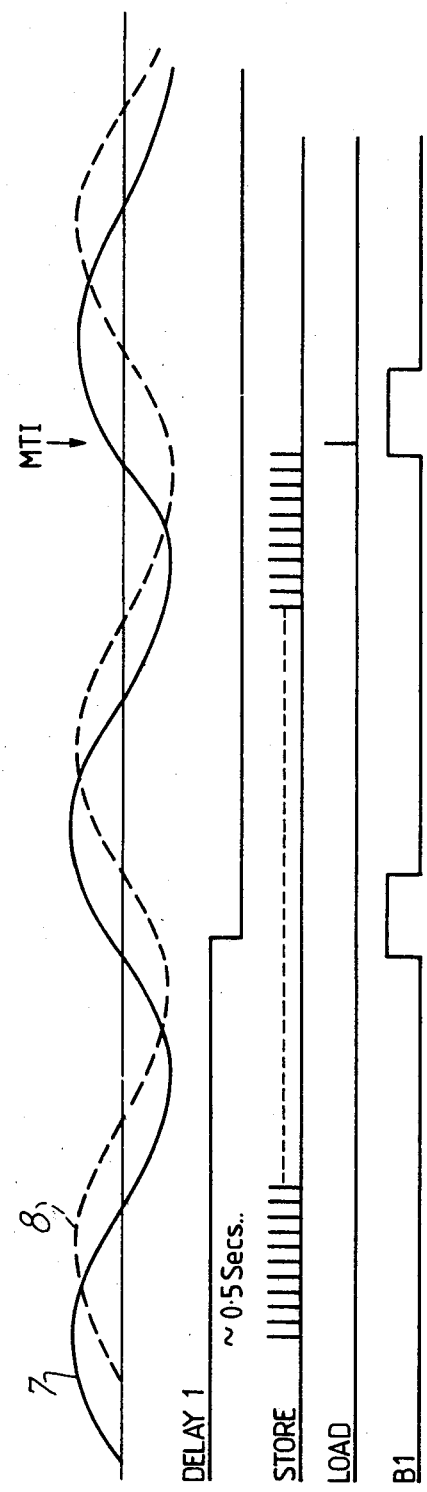

SWITCHING CIRCUIT FOR A REMOTE CONTROL SYSTEM

BACKGROUND OF THE INVENTION

The present invention relates to a switching circuit for a remote control system. The invention particularly concerns a remote control system of the kind comprising a transmitter which transmits appliance operating instructions to a receiver which is interposed between a power main and the appliance. It is impractical to have such a remote control system wherein the appliance can only be operated remotely. Therefore the present invention is concerned with a circuit enabling an appliance to be manually turned on after it has been remotely switched off by the control system.

SUMMARY OF THE INVENTION

According to the present invention there is provided a circuit arrangement for coupling an appliance to a power main, the arrangement having an input for connection to a power main, an output for connection to an appliance, remotely controllable switching means coupling the input and output, means for generating from the mains voltage an alternating current signal of a phase different from that of the mains voltage by an amount depending upon the external impedance across the output, means for detecting a phase difference change exceeding a predetermined value and means for changing the state of the switching means when, within a predetermined time period, two such changes in opposite senses are detected.

It will be seen, particularly from the ensuing description of a preferred embodiment of the invention, that a circuit arrangement according to the present invention can be constructed so as to cope with a variety of appliances, e.g. simple resistive loads such as heaters, complex loads such as televisions, radios and motors in which the power switch on the load does not completely isolate the load, and even thermostatically controlled loads. It can be designed to handle any of these loads without spurious operation even when confronted with noise on the mains power line.

Preferably, said state changing means is only operable to change the state of the switching means when each of said phase difference changes exceeds said predetermined value in each of a predetermined number of consecutive mains cycles.

The predetermined value for the phase difference change is preferably in the range from 100 to 257 microseconds, e.g. 125 or 250 microseconds.

The present invention is particularly applicable for use with the electrical appliance control system which is described and claimed in U.S. Pat. No. 4,200,862.

BRIEF DESCRIPTION OF THE DRAWINGS

For a better understanding of the present invention and to show how the same may be carried into effect reference will now be made to the accompanying drawings in which:

FIGS. 4a and 4b are diagrams of waveforms pertaining to the connector of FIG. 3.

DESCRIPTION OF PREFERRED EMBODIMENTS

Figure 1:
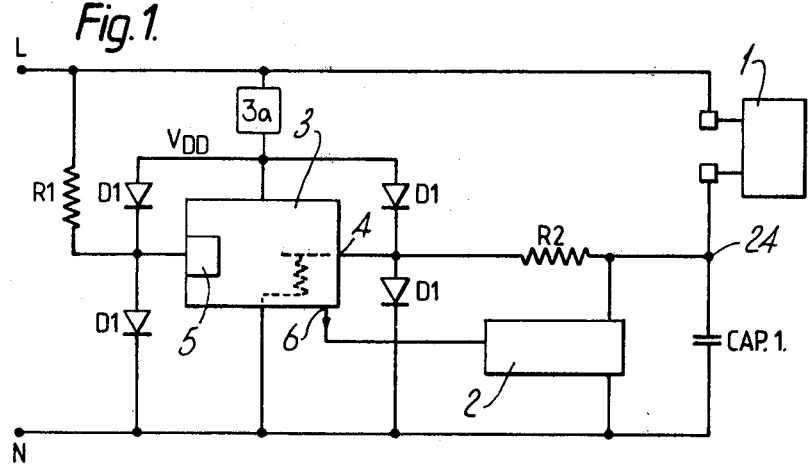
FIG. 1 is a diagram of a controllable mains connector for a domestic appliance.

FIG. 1 is a diagram of a controllable mains connector having pins L and N, for insertion into the live and neutral apertures of a mains socket, and a socket 28 into which a domestic appliance 1 can be plugged (e.g. as shown in the above-mentioned specification). It is assumed herein that the appliance has its own ON/OFF switch which will normally be in the ON state so that the appliance state can be controlled by the connector.

Switching means 2 couples the pin N to the socket. A capacitor CAP1 bypasses the switching means 2 to provide a small trickle current to the appliance 1 even when the switching means is open-circuit. The switching means 2 has a controller 3 in the form of an integrated circuit having a sense input 4, a mains zero-crossing detector input 5 and a switching output 6. The output 6 controls switching of the switching means 2.

Two isolating resistors R1 and R2 are provided as illustrated in FIG. 1 and allow diodes D1 to clamp the integrated circuit 3 between a biasing voltage VDD (supplied from the mains by a power supply 3a) and neutral N. VDD is typically −15 volts with respect to the voltage on the neutral line.

Figure 2:
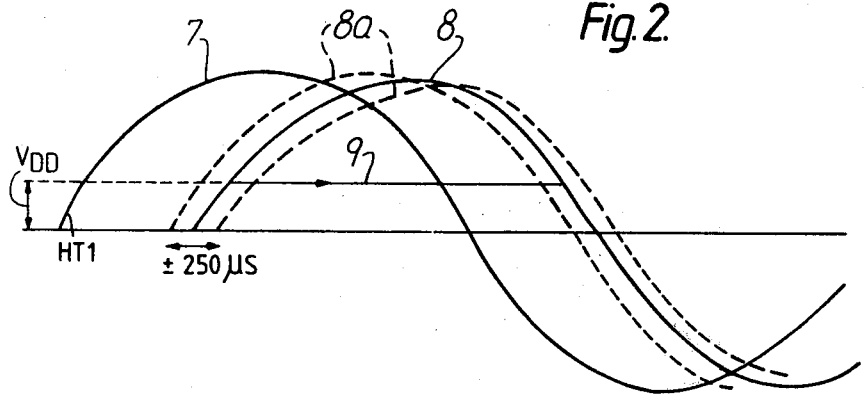
FIG. 2 is a diagram of waveforms pertaining to the connector of FIG. 1.

FIG. 2 shows the mains voltage waveform 7 which is detected by integrated circuit 3 at input 5. Input 5 is the input to a zero-crossing detector which generates a signal MTI substantially at each positive-going zero transition of the mains voltage 7. Voltage waveform 8 is the voltage waveform at the neutral return point 24 when the switching means 2 is non-conducting and assuming an appliance of finite impedance. The illustrated delay is caused by capacitor CAP1 and the input impedance of the appliance. Waveforms 8a illustrate waveforms of smaller and larger delay for different appliance impedances. The signal at the neutral return is clipped by the clamping diodes D1 and is sensed at sense input 4 as a signal 9 in FIG. 2.

Figure 3:
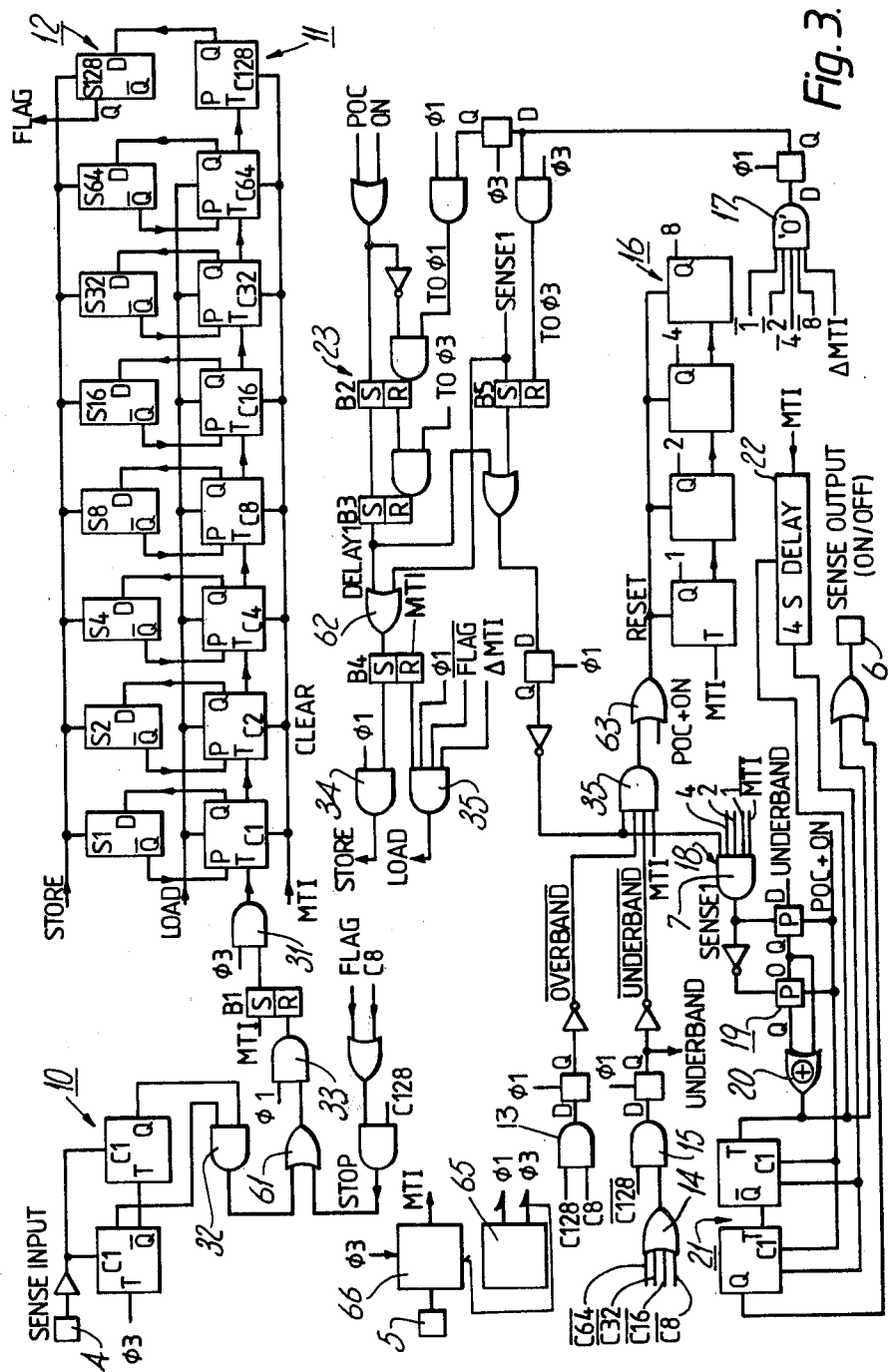
FIG. 3 is a logic circuit diagram of one implementation of part of the connector of FIG. 1.

FIG. 3 is a logic circuit diagram illustrating a positive logic implementation of the integrated circuit 3 of FIG. 1. This circuit operates under control of timing or clock pulses ∅1 and ∅3 shown in FIG. 4a and produced by a clock pulse generator 65. The circuit of FIG. 3 comprises sense input 4 connected via a noise suppression counter 10 to a phase delay counter 11 comprising stages C1 to C128. Delay counter 11 counts clock pulses ∅3 to determine the phase delay between the mains voltage (7 in FIG. 2) and the voltage at the sense input 4 (8 in FIG. 2).

A store comprises eight stages S1 to S128 the outputs of which are connected to the inputs, denoted P, of the delay counter 11 to feed data to counter 11 when line LOAD goes "high". The Q outputs of the stages of counter 11 are connected to the D inputs of store 12 to feed data to store 12 when a line carrying a signal STORE goes "high". Signals STORE and LOAD are generated by first delay circuit 23 which is responsive to signals POC (indicating that power has just been applied to the connector) and ON (indicating that the switching means 2 has been remotely switched off). The final stage of store 12 has an output which generates signal FLAG when the store 12 is full, FLAG generating signal STOP to halt counter 11.

Decoding gates 13, 14 and 15 monitor the state of counter 11 and generate signals OVERBAND or UN- DERBAND if the counted delay is more than 8 counts higher or lower respectively than the delay already stored in store 12.

A state counter 16 counts the number of consecutive mains cycles in which the phase delay is out-of-band. Counter 16 is clocked by mains zero-crossing signal MTI and is reset when an in-band delay is detected. Signal MTI is produced by zero-crossing detector 66 detecting positive-going zero-crossings of the mains voltage at input 5.

The state of counter 16 is detected by decoding gates 17 (state 0) and 18 (state 7). Gate 17 produces pulses TO$\emptyset$1 and TO$\emptyset$3 every time counter 16 overflows, i.e. when it reaches zero.

Gate 18 (state 7) generates a signal SENSE when the counter 16 reaches '7', i.e. indicating seven successive mains cycles with an out-of-band phase delay. The SENSE signal clocks the UNDERBAND signal into a two stage shift register 19. An exclusive-or gate 20 is connected to sense the states of each of the stages of register 19 and is connected to a two stage sequence counter 21 supplying SENSE OUTPUT 6. If the two stages of register 19 are in different states then the sequence counter 21 is clocked. A four second delay circuit 22 is connected to the counter 21 so that a signal is produced at SENSE OUTPUT 6 if counter 22 reaches state 2 within four seconds.

FIGS. 4a and 4b illustrate the form of some of the signals generated in the circuit of FIG. 3.

Referring to FIG. 4a the first line illustrates the mains voltage 7. The second and third lines illustrate clock pulses $\emptyset$1 and $\emptyset$3. These clock pulses have the same frequency, typically 35 KHz, but are out of phase with one another. Signal MTI is shown in line 4. This is produced on the first clock pulse $\emptyset$3 after a positive-going mains zero transition. Line 5 shows $\Delta$MTI which is a longer pulse than MTI and having a rising edge coincident with the rising edge of MTI and a falling edge coincident with the rising edge of the next clock pulse $\emptyset$3.

Pulses TO$\emptyset$3 and TO$\emptyset$1 are shown in lines 6 and 7.

Referring to FIG. 4b, the mains voltage waveform 7 is shown in line 1 by a solid line, and the delayed alternating current signal appearing at sense input 4 is shown by the dotted line 8. The second line shows the output DELAY 1 of the first delay circuit 23. The output of delay circuit 23 typically stays "high" for about 0.5 seconds after the appliance is remotely switched off and then goes "low". Line 3 of FIG. 4b shows signal STORE which is in the form of a pulse occurring at each clock pulse $\emptyset$1 until the first MTI signal after the output from delay circuit 23 has gone "low". Signal LOAD, shown in line 4, is a single pulse of the same length as $\emptyset$1 and occurs immediately following a sequence of STORE pulses.

The operation of the circuit will now be described. First, a brief description of the operation will be given with reference to all of the figures, then a more detailed explanation will be given with particular reference to FIG. 3.

The circuit of the invention enables an appliance to be manually switched ON after it has been remotely switched OFF. This is done by manual double switching of the appliance power switch within four seconds, e.g. from ON to OFF then to ON again. This condition causes two abrupt changes of opposite sense in the impedance presented by the load. The circuit can distinguish this condition from noise spikes, and also from the changes in impedance presented by thermostatically controlled loads.

The circuit measures changes in impedance by measuring phase changes in the signal at the sense input 4. Capacitor CAP1 ensures that, when switching means 2 is non-conductive, an alternating current voltage is always across the appliance to present to sense input 4 a current with a phase different from that of the mains voltage by an amount dependent upon the impedance of the appliance.

Integrated circuit 3 measures the phase difference between the mains, detected at input 5, and the signal at input 4 by measuring the time between positive-going zero-crossings of the mains and the signal at input 4. While the appliance is in its manual ON state, the phase difference will normally remain substantially constant, subject to a period of drift immediately following remote-controlled switch-off of the appliance.

When the appliance is switched on or off manually, the phase delayed signal at input 4 is phase shifted by an amount dependent on the consequent change of the impedance of the load presented by the appliance. Circuit 3 detects this change in phase delay. To avoid taking into account spurious noise spikes, a change in phase delay is only recognized if it is of at least a given magnitude and lasts for at least a given time. Circuit 3, having recognized such a change in phase delay of the signal at input 4, looks for another change in phase delay in the opposite direction. If such a second, opposite, change in phase delay is found within a predetermined time (4 seconds), circuit 3 then recognizes that it has received a valid instruction to turn ON the socket and issues an appropriate instruction via sense output 6 to change the state of switching means 2.

The operation of the circuit of FIG. 3 will now be described in more detail.

Counter 11 times the difference between zero-crossings of the signals 7 and 8 and to achieve this it is cleared at the beginning of each cycle of the mains signal 7 by signal MTI. Signal MTI also sets bistable B1, so enabling AND gate 31 to pass clock pulses $\emptyset$3 to counter 11, which then counts these clock pulses until the next positive-going zero-crossing of the phase delayed signal 8 is detected by elements 10, 32 and 61, when bistable B1 is reset. Hence, in each mains cycle, counter 11 counts to a number corresponding to the phase delay between the mains signal 7 and the phase delayed signal 8.

The noise suppression counter 10 is used to ensure that noise spikes on the line are not recognized as zero crossings of the phase delayed signal 8. A positive-going transition of the phase delayed signal 8 removes the CLEAR signal to the counter 10, enabling it to count pulses $\emptyset$3. If three of the pulses $\emptyset$3 are counted before the counter 10 is cleared, then the counter 10 recognizes a valid zero crossing and resets bistable B1 via AND gate circuit 32, OR gate 61 and AND gate 33.

In order to understand the circuit further, it is noted that, when the connector is first plugged into the mains, the signal POC is generated and, when the switching means 2 is remotely turned off, the signal ON is generated. Either POC or ON sets a bistable circuit B2 of the first delay circuit 23 which in turn sets a bistable circuit B3 and bistable circuit B4 via OR gate 62. Hence, AND gate 34 is then enabled to pass clock pulses $\emptyset$1 which become the signal STORE. STORE is applied to each stage of store 12 and causes store 12 to follow the count in counter 11. Signal STORE lasts for about 0.5 seconds after first plugging in or after remote switch-off. This gives sufficient time for transients to die away.

The bistable circuit B4 is reset at the next MTI (positive-going mains zero-crossing) after the output of bistable B3 (signal DELAY 1) goes "low". This removes signal STORE from store 12 freezing store 12 at the phase delay count value counted by counter 11 in the immediately preceding mains cycle. This count value will be referred to as the Reference Phase Delay. When bistable circuit B4 is reset, a signal LOAD is generated by AND gate 35. This is applied to counter 11 to cause the two's complement of the count value in store 12 to be loaded into stages C1 to C64 of counter 11 (stage C128 remains cleared).

Hence, at the beginning of the next mains cycle to occur after DELAY 1 goes low, i.e. approximately 0.5 seconds after the socket is remotely switched OFF, store 12 holds a count corresponding to the phase delay which existed approximately 0.5 seconds after the socket was switched off and counter 11 holds the two's complement of that count.

Counter 11 then continues to count the phase delay in each subsequent mains cycle but now starts from the two's complement of the Reference Phase Delay count. For example, if the Reference Count was 57, then counter 11 will count up from state 70, and if the Reference Count was 65, the counter 11 will count up from state 62. Hence, if the subsequent delay count is the same as the Reference Phase Delay Count then counter 11 will always stop at 127. However, if, for example, the phase delay should increase so that the counter 11 counts an extra 8 clock pulses, counter 11 will stop at count 135. If the phase delay decreases, then the counter 11 may stop at, for example, count 119 (a decrease of 8 clock pulses).

Decoding gates (13) and (14, 15) are set to decode counts in counter 11 corresponding to respectively an increase and a decrease in the phase delay of more than 8 counts. Signals OVERBAND and UNDERBAND are respectively generated if either of these out-of-band conditions is satisfied.

State counter 16 counts the number of consecutive out-of-band phase delays by clocking the signal MTI and being reset each time an in-band phase delay is detected. Counter 16 is reset via AND gate 35 and OR gate 63 when the socket is remotely switched OFF and also on each MTI signal during an in-band condition. When an out-of-band phase delay is detected, gate 35 is inhibited and counter 16 counts the number of consecutive cycles for which the delay is out-of-band. If seven consecutive out-of-band phase delays are detected, decoding gate 18 generates signal SENSE 1. This signal indicates, therefore, that the phase delay has changed since remote turn OFF by at least a given amount (8 counts of counter 11) and has remained out-of-band for at least a given amount of time (7 mains cycles).

Signal SENSE 1 clocks the state of signal UNDERBAND into state register 19. UNDERBAND will be "high" if the detected phase delay change was a decrease or it will be "low" if the change was an increase. SENSE 1 sets bistable circuit B5 to inhibit gate 35 from generating signal RESET to reset counter 16. This inhibiting signal lasts until bistable B5 is reset by TO∅3 nine mains cycles, approximately 150 µs, later (when counter 16 reaches state '0').

This provides a stabilization period after each SENSE 1 before the circuit looks for further phase delay changes. SENSE 1 also sets bistable circuit B4 causing signal STORE to be generated for one mains cycle. During this cycle the counter 11 counts from state '0' again and store 12 follows the count so that at the end of the mains cycle, when signal STORE is removed, store 12 holds a new Reference Phase Delay count corresponding to the changed phase delay. The two's complement of this new reference count is loaded into counter 11 by signal LOAD each mains cycle just after signal MTI. Counter 11 then continues to count the phase delay, in the same way as described above, with reference to the new Reference Count.

If the phase delay is still changing by more than 8 counts (this time from the new Reference Count) in each mains cycle, and again 7 consecutive out-of-band phase delays are detected, then SENSE 1 will be generated to clock the new state of signal UNDERBAND into the state register 19. Each time that the state of signal UNDERBAND is clocked into the state register, the exclusive OR gate 20 compares the new state of UNDERBAND with the previously recorded state of UNDERBAND. If the state of UNDERBAND changes, i.e. if a decrease in phase delay followed by an increase in phase delay is detected, then XOR gate 20 clocks sequence counter 21. If, within 4 seconds, the sequence counter 21 reaches state '2', indicating that the phase delay has increased then decreased then increased (or vice versa) then a valid manual instruction to switch ON has been received and sense output 6 switches the socket ON.

It will be noted that in this example the sequence register is primed to regard the first Reference Phase Delay Count as a decrease on the "previous" Delay Count. The circuit would work equally well if the sequence register were responsive to OVERBAND and was therefore primed to regard the first Reference Phase Delay Count as an increase on the "previous" Delay Count.

The circuit of the invention is intended to distinguish between a manual double instruction (OFF-ON, or ON-OFF) to turn on the power supply to an appliance and spurious signals on the power line caused by noise, or by switching transients when an appliance power switch is simply turned OFF, regardless of the type of appliance connected. Three general types of appliance 1 are possible:

(a) simple resistive loads, e.g. incandescent lamps, and heaters;

(b) complex RLC loads such as television sets, radios, stereo units, motor loads (attic fans, room air conditioners) and fluorescent lamps. With these types of loads the "ON-OFF" switch on the load may not completely isolate the load. Some televisions and radios for example have the power switch on the secondary side of the mains transformer. The characteristic of these types of loads is that their reactance changes gradually after power is removed as capacitors discharge or motors slow to a stop;

(c) thermostatically controlled devices, e.g. coffee pots, kettles, electric blankets, heaters and room air conditioners. With these types of loads the impedance may change abruptly some time after power has been removed from the load. For example, when an electrical coffee pot is switched on and power is applied, the load has a low impedance. However, when the coffee pot heats up to a particular temperature, its thermostat opens and causes the load to appear to be open-circuit to the connection. If the remote-control mains connector is then switched off remotely with the load in that condition, the thermostat will eventually close as the coffee pot cools. This has the same effect as manual closure of the power switch on the coffee pot when it is cold (i.e. thermostat already closed).

In type (a) resistive loads, the appliance power switch isolates the load so that when the appliance power switch is OFF (i.e. open) the impedance presented to the switching circuit is infinite and so there is effectively no signal present at the neutral return point 24. The switching circuit is designed to regard this condition as corresponding to a very large phase delay (very large impedance). When the switch is ON (i.e. closed) the impedance presented is smaller so the phase delay is smaller. Hence, the impedance presented to the mains connector changes abruptly when the appliance power switch is switched to OFF and then ON. Therefore an OFF-ON condition is easily recognized. It should be noted that the maximum delay stored in store 12 is 128×∅3 (approximately 4 microseconds) because when stage S128 of store 12 goes "high" signal FLAG goes "high" causing bistable circuit B1 to reset and stop the counter 11. In these loads, some switch bounce occurs after remote switch-off but this dies away within the 0.5 seconds (DELAY 1) allowed before the circuit starts to monitor the phase delay. After this switch bounce dies away the sensed impedance, and hence the phase delay, will be constant and so no spurious switching will occur.

With type (b) loads the phase delay of signal 8 with respect to the mains voltage continues to change well after the 0.5 seconds allowed for switch bounce. However this change is either a steady decrease or a steady increase so that two abrupt changes of opposite sense in the phase delay do not occur. Accordingly, sequence counter 21 will not reach state '2' and sense output 6 will not cause the power supply for the appliance to be switched ON.

For loads of type (c), consider first the case wherein the appliance power socket is remotely switched OFF before the load has acquired the desired temperature. The load here will respond in the same way as described for loads of type (b) so no spurious switching will occur.

In the case of the load having attained the required temperature at remote switch OFF, then the thermostat will be in the OFF (open) condition at remote switch-OFF. The load will cool (or heat up) away from the desired temperature and at a particular temperature the thermostat will close again to drive the temperature back to that required. Under these conditions, the phase delay will be steadily changing in a particular direction after remote switch OFF, then when the thermostat closes will abruptly change direction. It has been found that for most loads the phase delay gradually decreases after remote turn OFF and then increases when the thermostat recloses. As mentioned earlier, the sequence register 19 is primed to regard the first Reference Phase Delay Count as a decrease on the 'previous' phase delay, therefore, for most loads reactivation of the thermostat after remote turn-OFF would only be interpreted by the connector as one abrupt change in direction of the phase delay. Hence counter 21 would not reach state '2' and no spurious switching would occur. Even if the phase delay increases after remote turn-OFF and then decreases after the thermostat subsequently closes, it is unlikely that the thermostat will close within the 4 sec. required by the connector to produce a switching SENSE output.

Another situation to be considered is when the load has almost attained the required temperature when it is remotely switch OFF. There could be sufficient thermal delay in the system to cause the load to reach the required temperature and open the thermostat causing an increase in phase delay. If the load then drifted away from the required temperature sufficiently within 4 seconds to cause the thermostat to close and cause a decrease in phase delay, then counter 21 would reach state '2' and would switch the power to the appliance ON via sense output 6. This situation is extremely unlikely.

It will be appreciated that spurious signals such as noise spikes, caused for example by light dimmers or motor controllers, are also very unlikely to be mistaken for an OFF-ON switching sequence, even if they are repetitive because it is unlikely that a noise source could produce sufficiently consistent changes in phase delay and also appear to be switched on and off again within 4 seconds.

I claim:

1. A circuit arrangement for coupling an appliance to a power main, the arrangement comprising:
    an input for connection to a power main;
    an output for connection to an appliance;
    remotely controllable switching means coupling the input and output;
    means coupled to the output and the input for generating from the voltage at the input an alternating current signal of a phase different from that of the voltage at the input by an amount depending upon the external impedance across the output;
    means for detecting a phase difference change exceeding a predetermined value between the phase of said alternating current signal and the phase of the voltage at said input; and
    means for changing the state of the switching means when, within a predetermined time period, two such changes in opposite senses are detected.

2. A circuit arrangement as claimed in claim 1, and comprising counter means for counting mains cycles to cause the state of the switching means to change only when each of said phase difference changes exceeds said predetermined value in each of a predetermined number of consecutive mains cycles.

3. A circuir arrangement as claimed in claim 2, wherein said predetermined number is eight.

4. A circuit arrangement as claimed in claim 2, wherein said phase difference change detecting means comprises:
    counting means arranged to be cleared substantially at each positive-going mains zero-transition, and to count clock pulses between a positive-going mains zero-transition and a positive-going zero-transition of said alternating current signal of a difference phase; and
    means responsive to the count in the counting means to detect when said count corresponds to a change exceeding said predetermined value in one sense and in the other.

5. A circuit arrangement according to claim 4, wherein the phase difference change detecting means comprises storage means for storing that count which is attained by said counting means at one positive-going zero-transition of said alternating current signal and for loading the two's complement of that count into said counting means substantially at the subsequent positive-going mains zero-transition.

6. A circuit arrangement as claimed in claim 5, wherein said counting means is controlled by said responsive means for counting the positive-going transitions of the mains voltage whilst a change exceeding said predetermined value is detected in one of said senses, to provide a signal defining the attainment of said predetermined number.

7. A circuit as claimed in claim 6, and comprising control means for the storage means and for the counting means to provide the storage means with a store signal when the defining signal is produced to cause the storage means to store the current delay value as a count from the counting means and to provide, in the absence of said defining signal, a load signal for loading the two's complement of the count in the storage means into the counting means.

8. A circuit arrangement as claimed in claim 1, wherein said predetermined value for said phase difference change is in the range from 100 to 275 Microseconds.

9. A circuit arrangement as claimed in claim 1, wherein said predetermined time period is 4 seconds.

10. A circuit arrangement as claimed in claim 1, wherein said alternating current signal generating means comprises a capacitor connected across said switching means in circuit with said output.

11. A circuit arrangement as claimed in claim 1, wherein said phase difference change detecting means comprises:
  counting means arranged to be cleared substantially at each positive-going means zero-transition, and to count clock pulses between a positive-going mains zero-transition and a positive-going zero-transition of said alternating current signal of a difference phase; and
  means responsive to the count in the counting means to detect when said count corresponds to a change exceeding said predetermined value in one sense and in the other.

12. A circuit arrangement for coupling a switchable appliance to a power main, the arrangement comprising:
  an input for connection to a power main;
  an output for connection to a switchable appliance;
  remotely controllable switching means coupling the input and output; and
  means responsive to changes in external impedance across said output, consequent upon switching the appliance off and then on within a predetermined time period, to cause said switching means to change state.

* * * * *